United States Patent

[11] 3,532,110

| [72] | Inventor | Soren E. Peterson<br>1649 W. 33rd South, Salt Lake City, Utah 84104 |
|---|---|---|
| [21] | Appl. No. | 684,185 |
| [22] | Filed | Nov. 20, 1967 |
| [45] | Patented | Oct. 6, 1970 |

[54] ADJUSTABLE VALVED COUPLING
9 Claims, 7 Drawing Figs.

[52] U.S. Cl. ................................................ 137/322, 251/149.1
[51] Int. Cl. ................................................ F16l 29/00
[50] Field of Search ........................................... 251/145, 146, 149.1, 149.4, 149.5, 149.6, 149.8, 227, 238; 285/8 (Consult examiner), 310, 320; 137/317, 322

[56] References Cited
UNITED STATES PATENTS

| 552,771 | 1/1896 | Newhall | 285/8X |
| 2,898,128 | 8/1959 | Shohan | 251/149.1X |
| 3,266,768 | 8/1966 | Moschett | 251/149.5 |
| 2,355,408 | 7/1944 | Wyss | 251/149.4 |

Primary Examiner—William R. Cline
Attorney—C. Harvey Gold

ABSTRACT: A control valve having a housing with a ball valve adapted to seat against a valve seat in the housing, and a quick connect fitting, slidably connected to the discharge end of the housing, having a push rod secured therein which coacts with the ball valve in the housing to urge it away from its valve seat when the quick fitting is slid onto the housing. A yoke with adjustable connecting means can be secured to the valve housing for fixedly connecting the quick fitting to the housing and biasing means can be fitted on the housing to urge the quick fitting against the yoke.

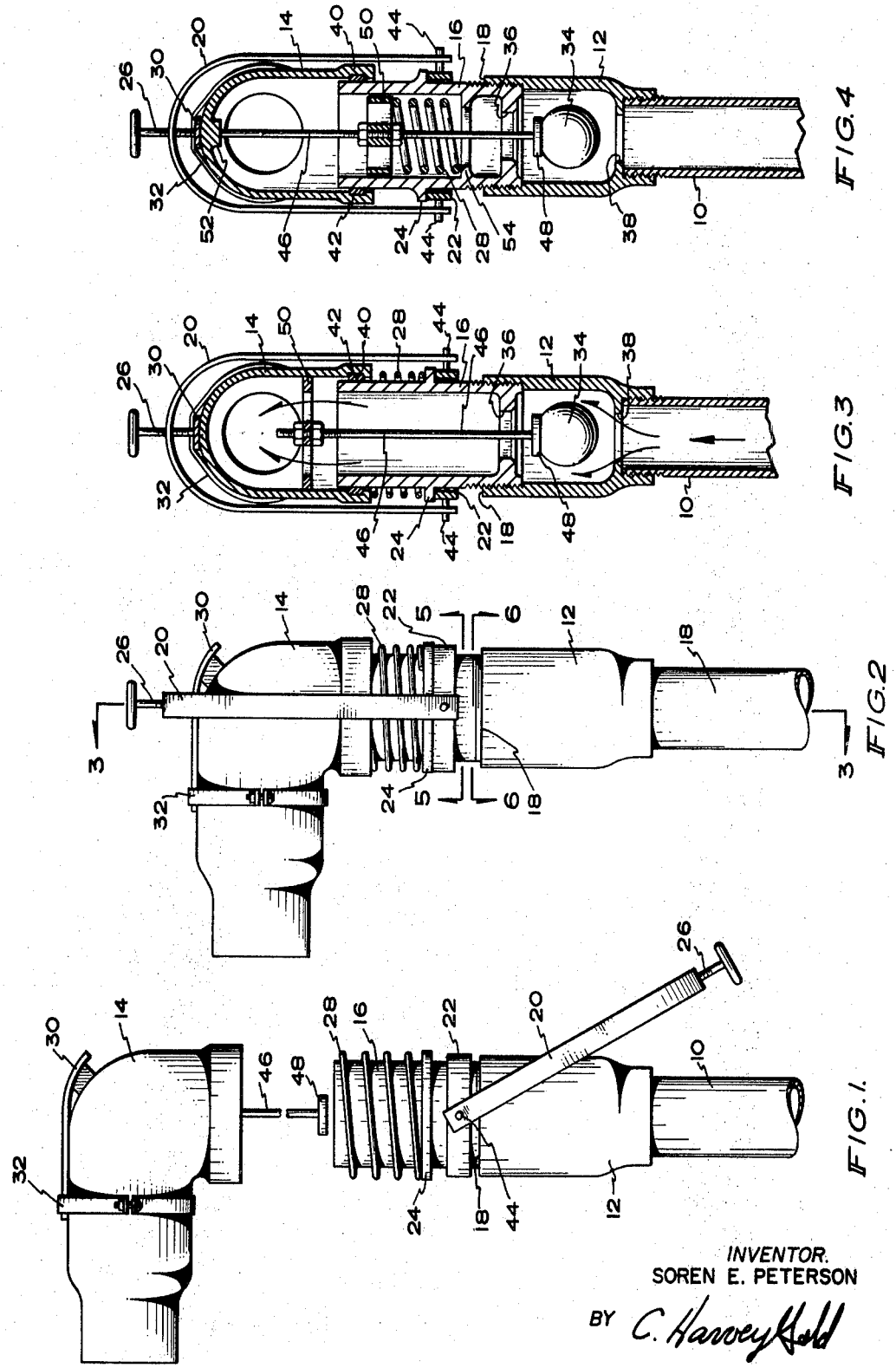

Patented Oct. 6, 1970

3,532,110

INVENTOR.
SOREN E. PETERSON

BY C. Harvey Gold

HIS ATTORNEY

ADJUSTABLE VALVED COUPLING

This invention relates to a control valve, and in particular, to a valve adapted to regulate water flow through irrigation headers.

In recent years irrigation systems have become very popular which include water supply lines adapted to coact with a movable distribution header for transporting irrigation water to a predetermined location. Generally the distribution header is provided with a quick-connect fitting for rapidly connecting it to any one of a number of supply lines. While irrigation systems of this type have proven to be suited for their intended purpose, it is often difficult to control the amount of water flow through the distribution header without providing a costly control valve on each supply line. Such valves are generally exposed to the outside elements making them susceptible to rust, corrosion and wear which makes them difficult to operate and often results in substantial maintenance expense.

It is the principle object of this invention to provide a valve suited for use on quick-connect distribution headers which valve is simple in design, inexpensive to construct, substantially maintenance free, which also provides means to easily adjust the flow of water through the distibution headers even when the valve is subjected to adverse atmospheric conditions for long periods of time.

Briefly, the invention comprises a valve housing secured to the discharge end of a water supply line with a ball type valve provided in the housing in a position to coact with a valve seat when the housing is filled with irrigation water to prevent water from flowing through said housing. A quick-connect fitting is slidably secured to the discharge end of the valve housing and a push rod is positioned within the fitting which is adapted to coact at one end with the ball valve in the valve housing, thereby urging the ball away from its seat, when the quick-connect fitting is slid onto the housing. A yoke with screw adjustment means is preferably mounted on the valve housing which coacts with the quick-connect fitting to hold the fitting in a predetermined position on the housing.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

In the drawings:

FIG. 1 is a plan elevation view of the valve of this invention mounted to a vertically extending supply line. A quick-connect fitting is shown positioned above the valve for coaction therewith.

FIG. 2 is an assembled view of the quick-connect fitting mounted on the valve housing in an operative position.

FIG. 3 is a sectional view of FIG. 2 taken along the plane of line 3-3.

FIG. 4 is a sectional view of the preferred valve and quick-connect fitting taken along a plane passed through the proximate center of the valve.

Figure 5:
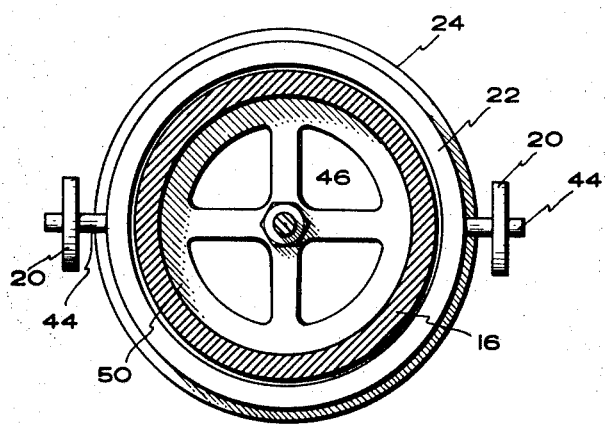
FIG. 5 is a sectional view of FIG. 2 taken along the plane of line 5-5.
Figure 6:
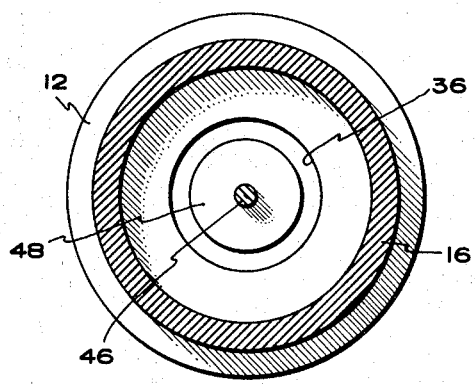
FIG. 6 is a sectional view of FIG. 2 taken along the plane of line 6-6.

Referring now more particularly to the drawings, there is shown supply line 10 connected at its intake end to a source of fluid such as irrigation water and connected at its discharge end to valve housing 12. Said valve housing 12 is preferably positioned to extend vertically above said supply line and is adapted to receive quick-connect fitting 14 on sleeve 16 which sleeve is secured to discharge end 18 of said valve housing. When quick-connect fitting 14 is urged onto said sleeve 16, yoke 20 is turned on collar 22 to move around quick-connect fitting 14, as shown in FIG. 2, whereupon adjustment screw 26 can be adjusted to position the quick-connect fitting at a predetermined location on said sleeve 16. Preferably collar 22 is rotatably mounted on sleeve 16 and is held with flange 24, which is fixedly secured to sleeve 16, from sliding off said sleeve. Biasing means such as coil spring 28, hereinafter described in detail, are preferably used to urge quick-connect fitting 14 upwardly against screw 26. In the preferred embodiment of this invention, cam base 30 is affixed to the quick-connect fitting as for example with clamp 32 to provide a runway for screw 26 to ride upon as yoke 20 is moved over the quick-connect fitting.

Ball valve 34 is preferably constructed from a material having a density less than the density of the liquid which is passed into valve housing 12 so that said ball will float on the liquid. For example, when the liquid is water the valve preferably has a density less than 1 gram/milliliter. The ball valve is positioned within housing 12 to coact with valve seat 36, connected to the intake end of sleeve 16, when the valve housing is filled with a liquid. Accordingly, the ball acts as a float valve to prevent liquid from flowing through the orifice defined by valve seat 36. A lower or second valve seat 38 can be provided proximate the intake side of the valve housing which is used as a check valve mechanism when a reverse pressure surge is applied to ball valve 34.

As previously indicated, sleeve 16 is attached to the discharge end of valve housing 12 for connecting quick-connect fitting 14 to said housing. The sleeve is a standard tubular member having an outside diameter sized to be received within the belled end 40 of quick-connect fitting 14. A sealing ring 42 such as a conventional O-ring is fitted within the belled end of the quick-connect fitting so that a liquid tight seal is formed between sleeve 16 and the quick-connect fitting. Yoke 20, with its adjusting screw 26 are used to secure the quick-connect fitting 14 on sleeve 16 and to control the amount of liquid passed into quick-connect fitting. It is within the scope of this invention to combine valve housing 12 and sleeve 16 as a single unit.

Ball valve 34 is urged open when quick-connect fitting 14 is pressed onto sleeve 16. This is accomplished through the use of push rod 46 which is secured within the quick-connect fitting and sleeve 16 so that the lower end of the push rod coacts with the ball valve when quick-connect fitting 14 is urged onto sleeve 16. Preferably, an inverted cup-shaped positioning member is secured to push rod 46 which holds the ball valve in a fixed position within the valve housing when the valve is urged into said housing by push rod 46. The push rod is fixedly connected to positioning plate 50 which is optionally secured to quick-connect fitting 14, as shown in FIG. 3, or is slidably mounted within sleeve 16, as shown in FIG. 4. When positioning plate 50 is slidably mounted within sleeve 16, push rod 46 is sized to ride upon the inner surface 52 of fitting 14 and spring 28 is positioned within sleeve 16 to coact against the bottom surface of said positioning plate 50 and against the top surface of stop ring 54 which is provided in sleeve 16 as shown in FIG. 4. When positioning plate 50 is fixedly connected to fitting 14 spring 28 can be mounted about the outside of sleeve 16 to coact against the bottom edge of fitting 14 and the top surface of flange 24 as shown in FIG. 3.

Figure 7:
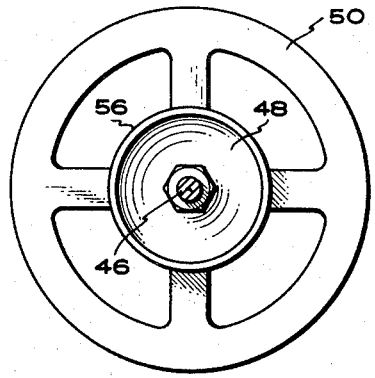
FIG. 7 is a top view of one type of plate used to position the valve plunger within the valve housing.

A bottom view of the positioning plate with the push rod and positioning cup 48 connected thereto is shown in FIG. 7. Preferably, the positioning cup has downwardly extending sidewalls 56 which are adapted to coact with the outside surface of ball 34. Cup 48 and positioning plate 50 are secured to push rod 46 in a conventional fashion as for example with nuts which are screwed on the push rod.

In using the valve of this invention quick-connect fitting 14 is positioned in coacting relationship with the discharge end of sleeve 16 whereupon the fitting is urged onto said sleeve to form a liquid-tight connection therewith. Yoke 20 is rotated on collar 22 until it is positioned directly over cam base 30 on fitting 14. Screw 26 is then tightened onto the base whereupon fitting 14 is slid downwardly onto sleeve 16 while push rod 46 urges ball valve 34 away from valve seat 36 thereby allowing fluid in supply line 10 to flow into fitting 14. The flow of fluid through valve seat 36 can be controlled by merely adjusting screw 26. When it is desired to remove the quick-connect fitting from sleeve 16 yoke 20 is pulled away from cam base 30 wherein spring 28 urges said quick-connect fitting to slide towards the discharge end of sleeve 16 and lift push rod 46 away from ball valve 34 which seats itself in valve seat 36 to block the flow of fluid.

I claim:

1. A control valve which comprises a valve housing with a fluid intake end and a discharge end; a valve seat positioned within said valve housing; valve means positioned within said valve housing to coact with said valve seat when fluid pressure is applied to the intake of said valve housing to control the flow of liquid past said valve seat; fitting means slidably mounted to the discharge end of said valve housing to receive fluid discharge from said housing; push rod means secured within said fitting means for urging said valve away from said valve seat when said fitting means is mounted on said discharge end of said valve housing; and connecting means secured to said valve housing and to said fitting means for adjusting the position of said fitting means with respect to said valve housing and thereby meter the flow of fluid past said valve seat, said connecting means comprising a yoke journaled to said valve housing and sized to rotate over said fitting means to hold said fitting means on said discharge end of said valve housing.

2. The control valve of claim 1 wherein adjusting means are connected to said yoke to coact with said fitting means for adjusting the position of said fitting means on said valve housing.

3. The control valve is claim 2 wherein cam surface means are secured to said fitting means for said adjusting means to ride upon when said yoke is moved over said fitting means.

4. The control valve of claim 1 wherein said valve means is a ball valve.

5. The control valve of claim 4 wherein said ball valve means has a density less than the fluid flowing into said valve housing.

6. The control valve of claim 1 wherein biasing means are connected to said valve housing which coact with said housing and said push rod means for urging said push rod means away from the ball valve when said fitting means is positioned on said discharge end of said valve housing.

7. A control valve which comprises a valve housing with a fluid intake end and a discharge end; a valve seat positioned within said valve housing; valve means positioned within said valve housing to coact with said valve seat when fluid pressure is applied to the intake of said valve housing to control the flow of fluid past said valve seat; fitting means slidably mounted to the discharge end of said valve housing to receive fluid discharge from said housing; push rod means secured within said fitting means for urging said valve away from said valve seat when said fitting means is mounted on said discharge end of said valve housing; connecting means secured to said valve housing and to said fitting means for adjusting the position of said fitting means with respect to said valve housing and thereby meter the flow of fluid past said valve seat; and biasing means connected to said valve housing which coact with said housing and said push rod means to urge said push rod means away from said valve when said fitting means is positioned on said discharge end of said valve housing.

8. The control valve of claim 7 wherein said valve means is a ball valve.

9. The control valve of claim 8, wherein said ball valve has a density less than the fluid flowing into said valve housing.